(12) United States Patent
Yang et al.

(10) Patent No.: US 9,341,755 B2
(45) Date of Patent: May 17, 2016

(54) OPTICAL FILM

(71) Applicant: UBRIGHT OPTRONICS CORPORATION, Dasi Town, Taoyuan County (TW)

(72) Inventors: Ching-An Yang, Dasi Town (TW); Kong-Hua Wang, Dasi Town (TW); Kai-Jing Wang, Dasi Town (TW); Yi-Chun Huang, Dasi Town (TW); Fang-Chun Yeh, Dasi Town (TW)

(73) Assignee: UBRIGHT OPTRONICS CORPORATION, Taoyuan County (TW)

( * ) Notice: Subject to any disclaimer, the term of this patent is extended or adjusted under 35 U.S.C. 154(b) by 218 days.

(21) Appl. No.: 13/973,821

(22) Filed: Aug. 22, 2013

(65) Prior Publication Data

US 2014/0071549 A1    Mar. 13, 2014

Related U.S. Application Data

(60) Provisional application No. 61/692,199, filed on Aug. 22, 2012.

(51) Int. Cl.
*G02B 5/04*    (2006.01)

(52) U.S. Cl.
CPC ..................... *G02B 5/045* (2013.01)

(58) Field of Classification Search
CPC ............... G02B 27/2214; G02B 27/22; G02B 27/0093; G02B 5/1814; G02B 5/18; G02B 5/045; G02B 4/04; G02F 1/01; G02F 1/29
USPC .......... 359/463, 240, 298, 576, 742, 720, 831
See application file for complete search history.

(56) References Cited

U.S. PATENT DOCUMENTS

| 2011/0267694 A1* | 11/2011 | Shiau et al. | 359/599 |
| 2012/0026720 A1* | 2/2012 | Cho | 362/84 |
| 2012/0113622 A1* | 5/2012 | Aronson et al. | 362/97.1 |

* cited by examiner

*Primary Examiner* — Bumsuk Won
*Assistant Examiner* — Grant Gagnon
(74) *Attorney, Agent, or Firm* — Min-Lee Teng; Litron Patent & Trademark Office (57) ABSTRACT

An optical film comprises a transparent supporting substrate and a structuralized layer integrally formed on the supporting layer and having a plurality of light-concentrating units including design that varies in height along their length or varies in pitch of prism structure to overcome the optical defects (wet-out) of the optical film and to enhance the optical properties of the optical film.

17 Claims, 11 Drawing Sheets

OPTICAL FILM

CROSS REFERENCE TO RELATED APPLICATIONS

This application claims the priority of U.S. Provisional Patent Application No. 61/692,199 filed on Aug. 22, 2012. This application is fully incorporated by reference as if fully set forth herein. All publications noted in the specification below are fully incorporated by reference as if fully set forth herein.

BACKGROUND OF THE INVENTION

1. Field of the Invention

The present invention relates to an optical film, and, in particular, relates to an optical film capable of avoiding optical defects (e.g. wet-out, moiré fringes and so on). Further, the present invention relates to an optical film used to the backlight module of a flat panel display.

2. Description of Related Art

The backlight module of the flat panel display and its common structure are very familiar to a person with ordinary skills in the art. Most of the current backlight modules used in the flat panel display employ two light enhancement sheets in order to have better output brightness. However, a troublesome optical coupling effect (i.e. wet-out) more frequently occurs when the two stacked light enhancement sheets get close to each other.

The convention methods for reducing the occurrence of the wet-out let the two optical films physically away from each other as far as possible. That is, the heights of adjacent portions of the two optical films are accordingly modified. U.S. Pat. No. 5,771,328 disclosed an optical film having taller prisms (See numeral reference 56 in its drawings) and shorter prisms (See numeral reference 54 in its drawings). When the optical film is disposed on another one, the physical proximity to another is limited so that the visibility of a wet-out pattern is reduced. However, the taller prisms of the prior art still may be visual as straight lines through the optical film.

In view of above, since the applicant of the present application have found the shortcomings of the foregoing prior art for a long term, he proposes a novel optical film so as to overcome the shortcomings.

BRIEF SUMMARY OF THE INVENTION

The present invention provides an optical film with a structuralized surface. The structuralized surface can get rid of the occurrence of optical defects in a display, and particularly, random or inhomogeneous optical characteristics can avoid the defects such as wet-out and moiré fringes.

The present invention provides an optical film comprising a transparent supporting substrate and a structuralized layer. The structuralized layer is integrally formed on the supporting layer, and has a plurality of light-concentrating units. The light-concentrating units includes design that varies in height along their length or varies in pitch of prism structure to overcome the optical defects (e.g. wet-out) of the optical film and to enhance the optical properties of the optical film.

The present invention provides an optical film, comprising: a transparent supporting substrate; a structuralized layer including a plurality of prisms integrally arranged on the transparent supporting substrate along their longitudinal directions; wherein the height of at least one of the prisms varies along its longitudinal direction and the variation in the height includes a first change mode and a second change mode; wherein the trajectory generated from the second change mode is superposed on and along the trajectory generated from the first change mode.

The present invention provides an optical film, comprising: a transparent supporting substrate; a structuralized layer including a plurality of prisms integrally arranged on the transparent supporting substrate along their longitudinal directions; wherein the pitches between the prisms vary with a first change mode and the heights of the prisms vary with a second change mode along their longitudinal directions.

The present invention provides an optical film, comprising: a transparent supporting substrate; a structuralized layer including a plurality of prisms integrally arranged on the transparent supporting substrate along their longitudinal directions; wherein the extended trajectories of the prisms vary with a first change mode on their longitudinal directions and the heights of the prisms vary with a second change mode along their longitudinal directions.

BRIEF DESCRIPTION OF THE DRAWINGS

In order to sufficiently understand the essence, advantages and the preferred embodiments of the present invention, the following detailed description will be more clearly understood by referring to the accompanying drawings.

DETAILED DESCRIPTION OF THE INVENTION

The following description shows the preferred embodiments of the present invention. The present invention is described below by referring to the embodiments and the figures. Thus, the present invention is not intended to be limited to the embodiments shown, but is to be accorded the principles disclosed herein. Furthermore, that various modifications or changes in light thereof will be suggested to persons skilled in the art and are to be included within the spirit and purview of this application and scope of the appended claims.

Figure 1A:
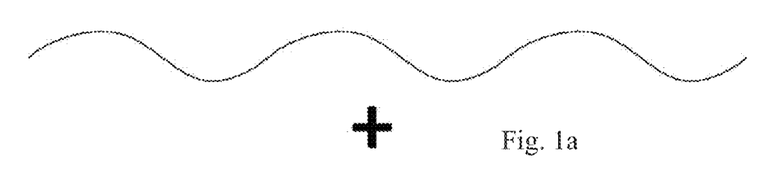
FIGS. 1a-1c illustrate the first kind of change concepts in accordance with the present invention.
Figure 1B:
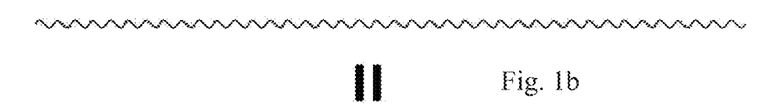
Figure 1C:
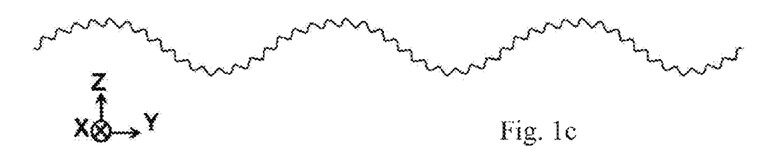

An optical film has a structure varying in its height or pitch along a longitudinal direction (prism). The variation includes at least two normal periods, wherein the first change period is larger than a second change period. Furthermore, the variation also cannot be periodic, or can be defined in a broader change manner, e.g. a random change or a change repeatedly showing two (or more) periods. Therefore, the application designates the first variation mode and the second variation mode as a general variation mode. The foregoing normal period mean the average of the periodic lengths appearing in the first change mode. That is, each periodic length or pitch in the first change mode can be changeable or constant. For example, the periodic lengths P11, P12, P13, P11, P12, P13 . . . appear in the first change mode. P11, P12 and P13 can be the same or totally different. The following embodiments can be explained according to the foregoing definitions, wherein the first change period and the second change period also can be replaced by the first change mode and the second change mode. FIGS. 1a-1c illustrate the first kind of change concepts in accordance with the present invention. The periods of the two changes both appear in a sine wave. The first change period (as shown in FIG. 1a; or called the first change mode) in combination with the second change period (as shown in FIG. 1b; or called the second change mode) form a composite change period (as shown in FIG. 1c; or called a composite change mode). In fact, such a composite change mode can be applied to the prism structure of the optical film for varying prisms' height along its longitudinal direction and/or prisms' pitch (i.e. the center-to-center distance of two adjacent prisms is changeable). The first and second change periods can have a variation toward its lateral direction (the lateral direction indicates a lateral or transversal perturbation occurring in a sine wave along its wave front but not indicates the lateral side of each prism) in a regular, half-regular, random or quasi-random manner. The first change has a nominal period ranging from 50 µm to 1,000 mm, and the second change has a nominal period ranging from 50 µm to 1,000 µm. The nominal period of the first change is 4 times to 1,000 times the nominal period of the second change. Or, the nominal period of the first change is 0.01 times to 1,000 times the nominal period of the second change.

For easy explain and understand the application, an X, Y and Z orthogonal coordinate system (See FIG. 1c) is used to interpret variation directions. The X axis direction is transverse to the direction from the wave crest to the trough of the prism, or can be called a lateral direction. The Y axis is perpendicular to the X axis, and in general, is the lengthwise direction of the prism. The Z axis is perpendicular to the X and Y axes, i.e. the common height direction of the prism. As to the first concept, the height (parallel to the Z axis) of the prism varies along the lengthwise direction (parallel to the Y axis direction) of the prism. The variations reflecting both of the first and second change periods occur in the Z axis along the Y axis. That is, the height (Z axis) of the prism has the composite variation including the first and second change modes along the lengthwise direction (Y axis) of the prism. The pitches between the prisms are constant and parallel.

Figure 2A:
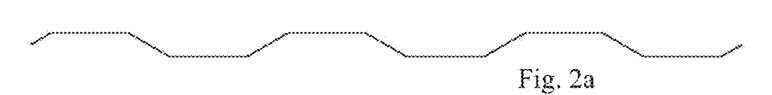
FIGS. 2a-2c are further examples illustrating the first kind of change concepts in accordance with the present invention.
Figure 2B:
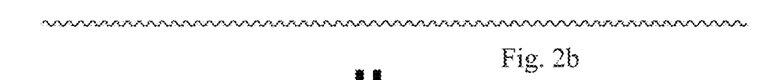
Figure 2C:
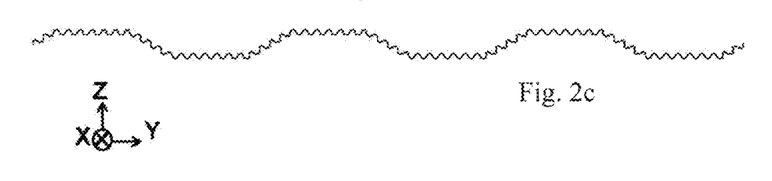

FIGS. 2a-2c are further examples illustrating the first kind of change concepts in accordance with the present invention. Two change periods are shown in the form of a square wave. The first change period (FIG. 2a) is combined with the second change period (FIG. 2b) to form a composite change period (FIG. 2c). Practically, the composite variation can be applied to the prism structure of an optical film to change the height H and/or pitch P of the prism along its lengthwise direction. The first and second change periods can have a variation toward its lateral direction in a regular, half-regular, random or quasi-random manner. The first change has a nominal period ranging from 50 µm to 1,000 mm, and the second change has a nominal period ranging from 50 µm to 1,000 mm. The nominal period of the first change is 4 times to 1,000 times the nominal period of the second change. Or, the nominal period of the first change is 0.01 times to 1,000 times the nominal period of the second change. Furthermore, the first and second change periods can be reflected on any waveforms such as a sine wave, a square wave, a saw wave, a triangle wave and so on.

Figure 3A:
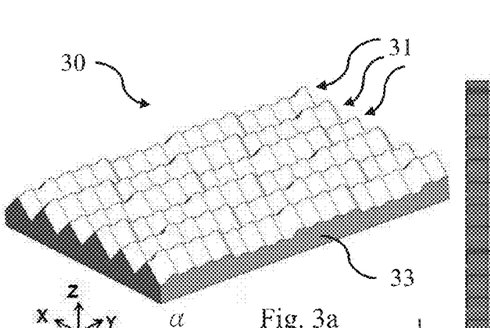
FIGS. 3a-3d are an embodiment using the first kind of change concepts in accordance with the present invention.
Figure 3B:
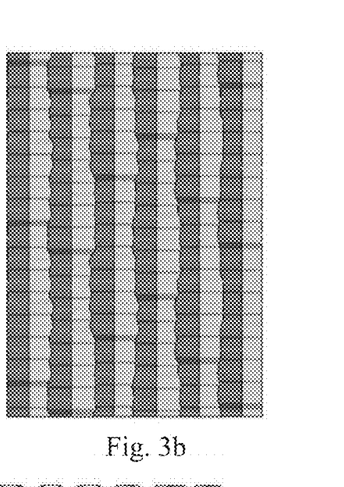
Figure 3C:
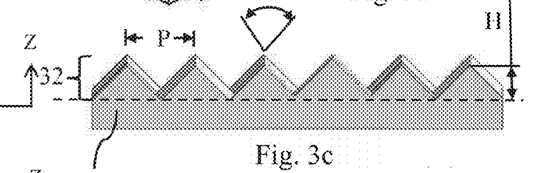
Figure 3D:
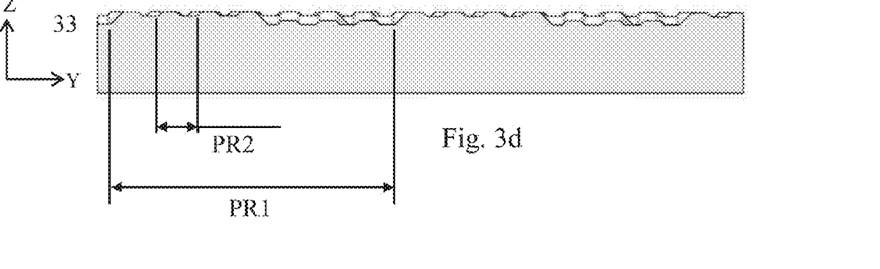
Figure 4A:
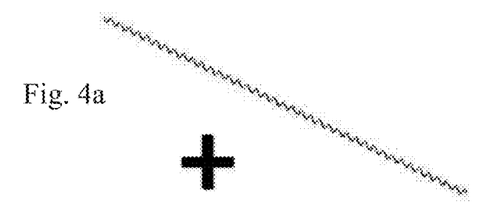
FIGS. 4a-4e illustrate the second kind of change concepts in accordance with the present invention.
Figure 4B:
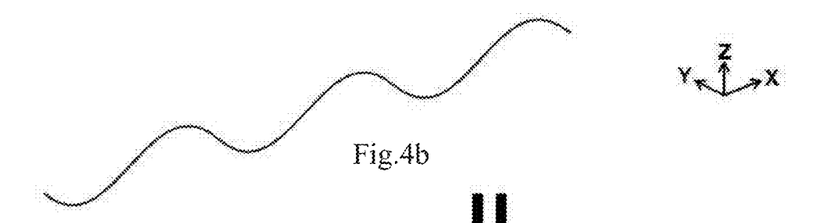
Figure 4C:
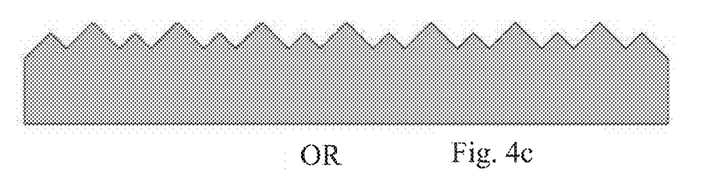
Figure 4D:
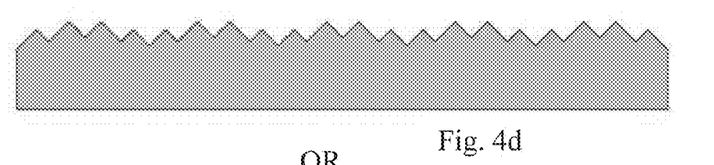
Figure 4E:
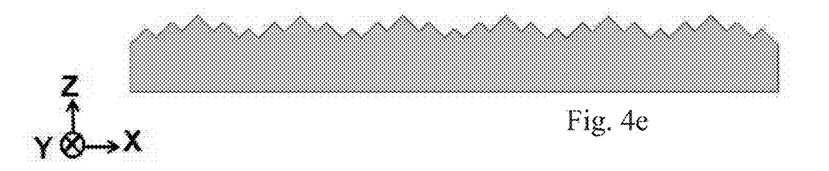
Figure 5A:
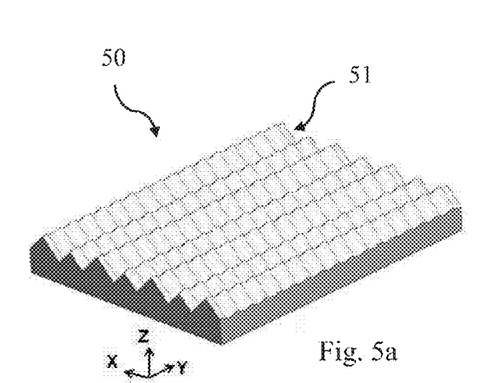
FIGS. 5a-5d are the first embodiment using the second kind of change concepts in accordance with the present invention.
Figure 5B:
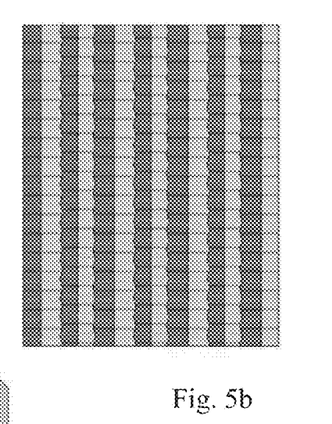
Figure 5C:
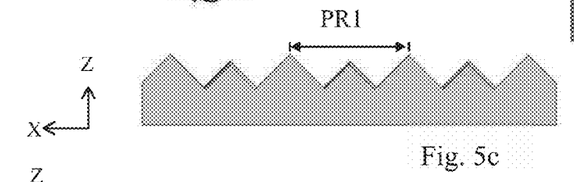
Figure 5D:
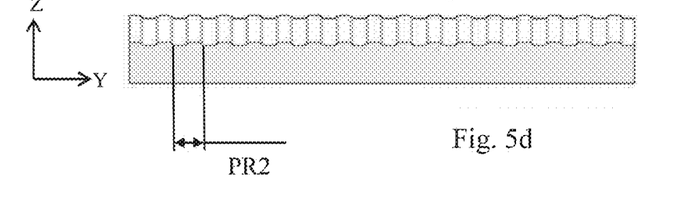
Figure 6A:
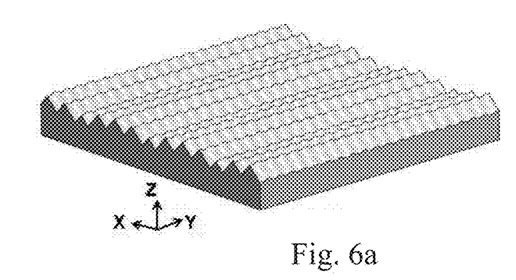
FIGS. 6a-6d are the second embodiment using the second kind of change concepts in accordance with the present invention.
Figure 6B:
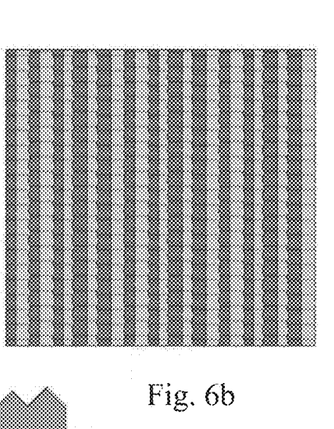
Figure 6C:
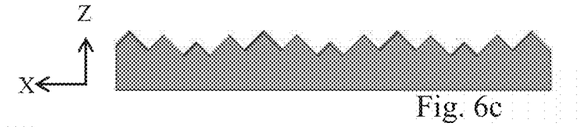
Figure 6D:
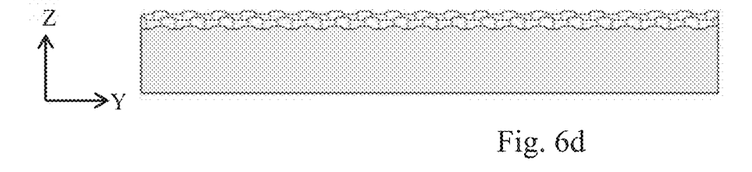

FIGS. 3a-3d are an embodiment using the first kind of change concepts in accordance with the present invention. FIG. 3a shows a brightness enhancement film 30 of the present invention. FIG. 3b is a top view of the brightness enhancement film 30 in FIG. 3a. FIG. 3c is a front view of the brightness enhancement film 30 in FIG. 3a. FIG. 3d is a cross-sectional view of the brightness enhancement film 30 in FIG. 3a taken along the crest line of a prism. The first and second change periods can be reflected in a square waveform for varying the height of the prism structure. The nominal period PR1 of the first change is 4 times to 400 times the nominal period PR2 of the second change. Or, the nominal period PR1 of the first change is 0.01 times to 1,000 times the nominal period PR2 of the second change. The pitch between the prisms is preferably between 10 µm to 200 µm, and more preferably between 24 µm to 60 µm. The average amplitude of the first change period ranges from 1 µm to 5 µm. That is, the total height of the structure of the prism 31 varies in a range of 1 µm to 5 µm. The included angle between the structuralized surfaces of the prism 31 can be any degree in a range of 70 degrees to 110 degrees, more preferably between 80 degrees to 100 degrees. In this embodiment, such prism structure can decrease the contact area between the structuralized surfaces of the prism film (brightness enhancement film) so as to reduce the occurrence of optical coupling. As shown in FIG. 3b, the brightness enhancement film 30 comprises a transparent supporting substrate 33 and a structuralized layer 32. The structuralized layer 34 is integrally formed on the transparent supporting substrate 33.

FIGS. 4a-4e illustrate the second kind of change concepts in accordance with the present invention. The height (Z axis) of the prism varies along the lengthwise direction (Y axis) and the lateral direction (X axis) of the prism. The first change period (FIG. 4a) has a variation in the Z axis along the X axis, and the second change period (FIG. 4b) has a variation in the Z axis along the Y axis. The prisms are parallel to each other and their pitch is constant.

FIGS. 5a-5d are the first embodiment using the second kind of change concepts in accordance with the present invention. And, FIGS. 6a-6d are the second embodiment using the second kind of change concepts in accordance with the present invention. The first and second change periods are all reflected on the height of the prism structure. If other embodiments illustrate a non-periodical or random variation, the first and second change periods can be called or replaced by first and second change modes. The present invention is not limited to this embodiment. The nominal period of the first change is 4 times to 400 times the nominal period of the second change. Or, the nominal period of the first change is 0.01 times to 1,000 times the nominal period of the second change. The prisms are parallel to each other and their pitch is constant. The pitch of the brightness enhancement film 50 (prisms 51) between its prisms is preferably between 10 μm to 200 μm, and more preferably between 24 μm to 60 μm. The average amplitude of the first change period ranges from 2 μm to 10 μm, and the average amplitude of the second change period ranges from 1 μm to 5 μm. That is, the total height of the structure of the prism 51 varies in a range of 1 μm to 15 μm. The included angle between the structuralized surfaces of the prism 51 can be any degree in a range of 70 degrees to 110 degrees, more preferably between 80 degrees to 100 degrees. In this embodiment, such prism structure can decrease the contact area between the structuralized surfaces of the prism film (brightness enhancement film) so as to reduce the occurrence of optical coupling.

Figures 7A, 7B, 7C:
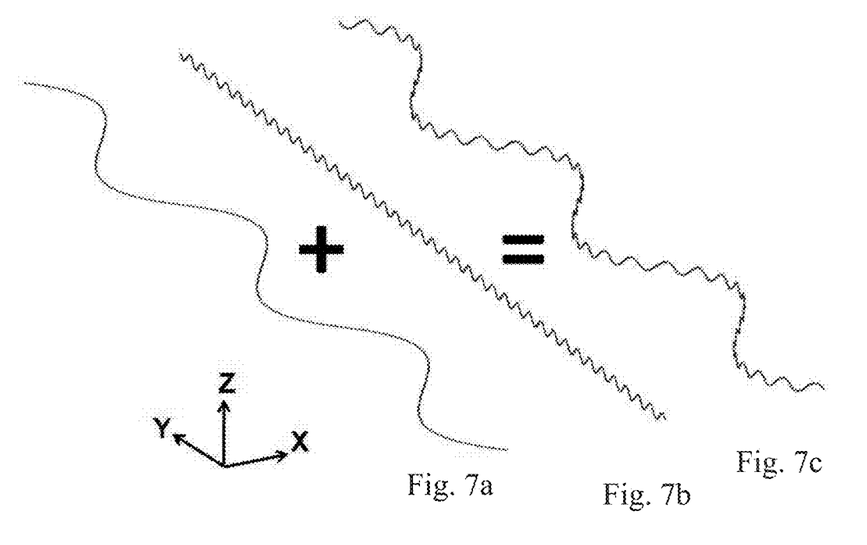
FIGS. 7a-7c illustrate the third kind of change concepts in accordance with the present invention.
Figures 8A, 8B, 8C:
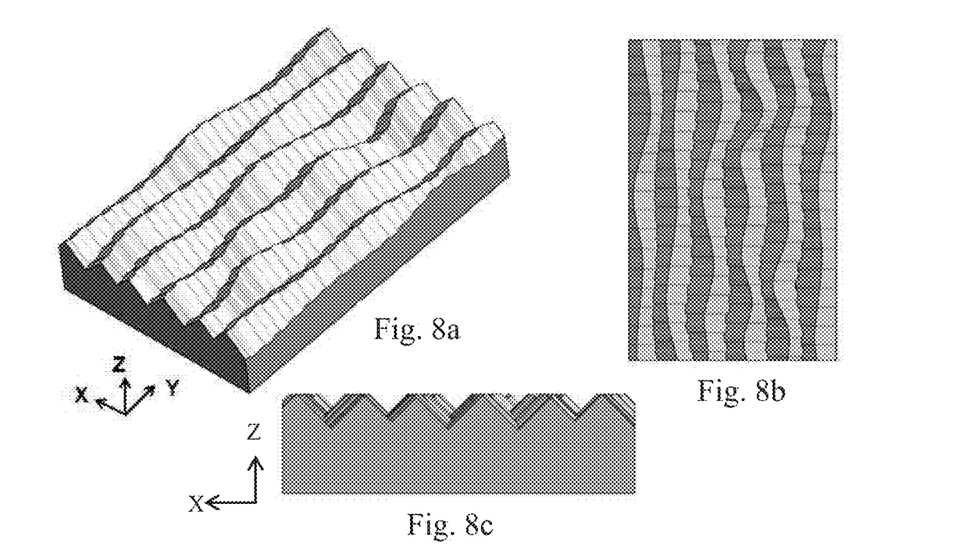
FIGS. 8a-8d are an embodiment using the third kind of change concepts in accordance with the present invention.
Figure 8D:
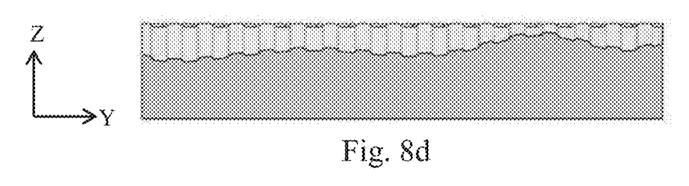

FIGS. 7a-7c illustrate the third kind of change concepts in accordance with the present invention. The first change period (FIG. 7a) is combined with the second change period (FIG. 7b) to form a composite change period (FIG. 7c). The first change period can be applied to the prism structure of an optical film for varying the pitches (X axis) between the prisms along their lengthwise direction (Y axis). The second change period can be applied to the prism structure of an optical film for varying the heights (Z axis) of the prisms along their lengthwise direction (Y axis). In this embodiment, the height (Z axis) of the prism varies along its lateral direction (X axis). The first change period has a variation in the X axis along the Y axis, and the second change period has a variation in the Z axis along the Y axis. The first change has a nominal period ranging from 50 μm to 1,000 mm, and the second change has a nominal period ranging from 50 μm to 1,000 mm. The nominal period of the first change is 4 times to 1,000 times the nominal period of the second change. Or, the nominal period of the first change is 0.01 times to 1,000 times the nominal period of the second change.

FIGS. 8a-8d are an embodiment using the third kind of change concepts in accordance with the present invention. The first change period is reflected on the pitches of the prism structure, and the second period is reflected on the heights of the prism structure. The nominal period of the first change is 4 times to 400 times the nominal period of the second change. The pitch between two prisms is constant and they are parallel to each other. The pitch between the prisms is preferably between 10 μm to 200 μm, and more preferably between 24 μm to 60 μm. The average amplitude of the first change period ranges from 2 μm to 10 μm, and the average amplitude of the second change period ranges from 1 μm to 10 μm. The included angle of the prism structure can be any degree in a range of 70 degrees to 110 degrees, more preferably between 80 degrees to 100 degrees. In this embodiment, such prism structure can decrease the contact area between the structuralized surfaces of the prism film (brightness enhancement film) so as to reduce the occurrence of optical coupling (wet out). The prism structure of the present embodiment can minimize the possibility of seeing optical interference fringes (moiré; or moiré fringes).

Figures 9A, 9B, 9C:
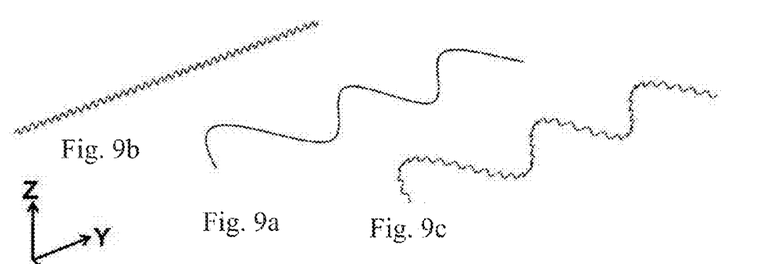
FIGS. 9a-9c illustrate another kind of change concepts in accordance with the present invention.

In another change concept (not shown in figures) of the present invention, the first and second change periods can all be reflected on both of the pitch and height of the prism structure. In other words, the first and second change periods are applied to vary the pitch (X axis) and the height (Z axis) along either the Y axis or the X axis. FIGS. 9a-9c illustrate another kind of change concepts in accordance with the present invention. The first change period (FIG. 9a) is combined with the second change period (FIG. 9b) to form a composite change period (FIG. 9c). According to the first change period, the pitch (X axis) and the height (Z axis) of the prism structure vary along the lengthwise direction (Y axis). Further, according to the second change period, the height (Z axis) of the prism structure varies along the lengthwise direction (Y axis). In the embodiment, the height (Z axis) of the prism simultaneously varies along the lateral direction (X axis) and the lengthwise direction (Y axis). The first change period has a variation in the X axis and the Z axis along the Y axis, and the second change period has a variation in the Z axis along the Y axis. The first and second change periods can have a variation toward its lateral direction in a regular, half-regular, random or quasi-random manner. The first change has a nominal period ranging from 50 μm to 1,000 mm, and the second change has a nominal period ranging from 50 μm to 1,000 mm. The nominal period of the first change is 4 times to 1,000 times the nominal period of the second change. Or, the nominal period of the first change is 0.01 times to 1,000 times the nominal period of the second change.

Figures 10A, 10B:
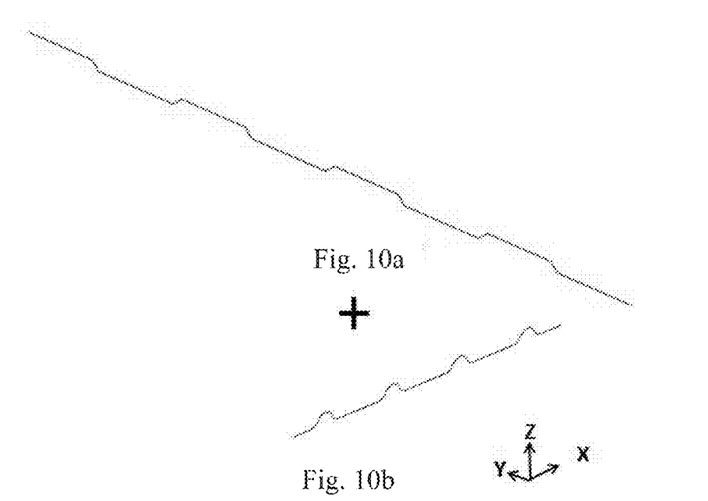
FIGS. 10a-10c illustrate another example using the second concepts (FIG. 4)
Figure 10C:
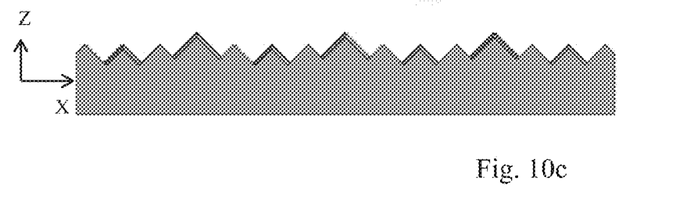
Figure 10D:
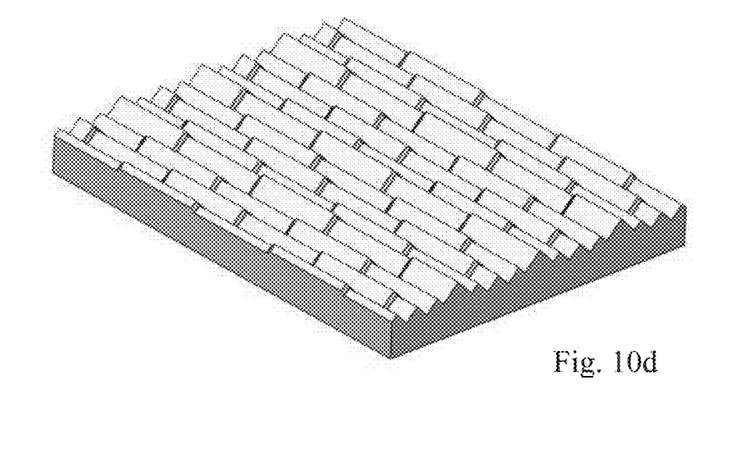
FIG. 10d is another optical film carrying out the second concepts (FIG. 4) in accordance with the present invention.

FIGS. 10a-10c illustrate another example using the second concepts (FIG. 4). The first change period has a variation (FIG. 10b) in the Z axis along the X axis, and the second change period has a variation (FIG. 10a) in the Z axis along the Y axis. Both of the first and second change periods are reflected on the variation of the height of the prism. The lengths of the first and second change periods can be random values. The nominal period of the first change is 0.01 times to 400 times the nominal period of the second change. FIG. 10d is an optical film of the present invention, i.e. another embodiment of the brightness enhancement film (BEF or prism sheet).

Figure 11:
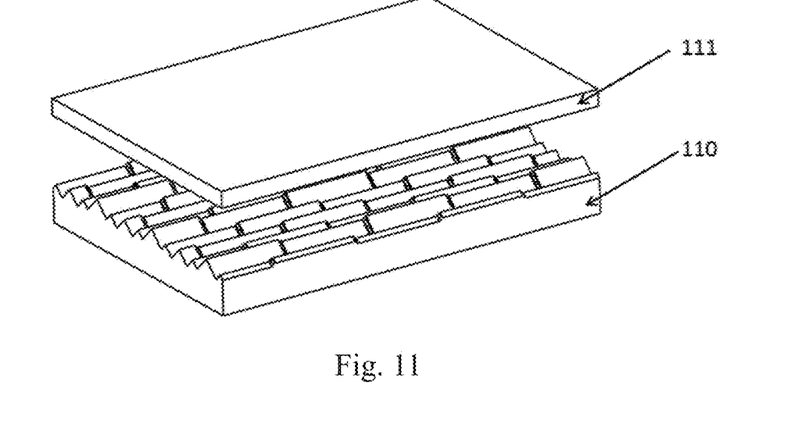
FIG. 11 shows the relative positions of the optical film as shown in FIG. 10d and an LCD panel located.
Figure 12:
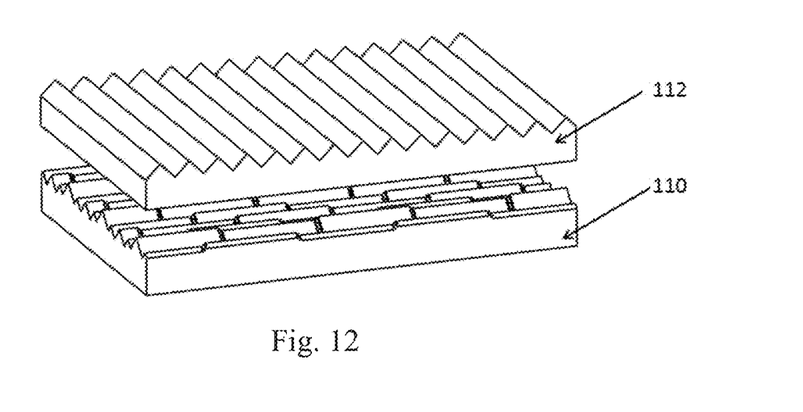
FIG. 12 shows the relative positions of the optical film as shown in FIG. 10d and another optical film located.

As shown in the table 1 below, the experiment is conducted based on the foregoing change concepts. The defects of the optical interference fringes and wet out (BEF to LCD panel) are inspected from a 47 inches TV whose resolution is 1920× 1080. The relative positions of an optical film 110 and an LCD panel 111 arranged are shown in FIG. 11. The numeral reference 110 indicates the brightness enhancement film mentioned therein. The extending direction of the prism is parallel to the longitudinal edge of the LCD panel. A light source is incident to the back surface of the optical film and is emitted from the prism surface, and then enters into the LCD panel 111. The defects of the optical interference fringes and wet out can be seen on the LCD panel 111 by eyes, and are resulted from the optical film 110. As shown in FIG. 12, another kind of the wet out defect (BEF to BEF) is resulted from a brightness enhancement film 112 disposed above the foregoing optical film, and can be or cannot be inspected by eyes.

Referring to the Table 1, it shows the optical film has the great ability to avoid the wet out effect not only for the BEF to LCD but also for BEF to BEF. Particularly, the samples 5, 9, and 12 have the best results on the resistance to the optical interference fringes. The existing optical interference fringes are not visual.

TABLE 1

| | First change period | | Second change period | | Prism | | | | |
|---|---|---|---|---|---|---|---|---|---|
| Sample | Nominal Period (μM) | Amplitude (μM) | Nominal Period (μM) | Amplitude (μM) | Angle | Nominal Period (μM) | moiré | Wet out (BEF-panel) | Wet out (BEF-BEF) |
| 1 | 337 | 10 | 2000 | 3 | 90° | 33 | YES | NO | NO |
| 2 | 284 | 10 | 2000 | 3 | 90° | 33 | YES | NO | NO |
| 3 | 766 | 10 | 2000 | 3 | 90° | 33 | YES | NO | NO |
| 4 | 931 | 10 | 2000 | 3 | 90° | 33 | YES | NO | NO |
| 5 | 942 | 7.5 | 2000 | 3 | 90° | 38 | NO | NO | NO |
| 6 | 816 | 6 | 2000 | 3 | 90° | 33 | NO | NO | NO |
| 7 | 820 | 5 | 2000 | 3 | 90° | 50 | YES | NO | NO |
| 8 | 200 | 3 | 2000 | 3 | 90° | 50 | YES | NO | NO |
| 9 | 620 | 5 | 2000 | 3 | 90° | 50 | Slight | NO | NO |
| 10 | 1120 | 5 | 2000 | 3 | 90° | 50 | YES | NO | NO |
| 11 | 676 | 7.5 | 2000 | 3 | 90° | 38 | NO | NO | NO |
| 12 | 1132 | 7.5 | 2000 | 3 | 90° | 38 | NO | NO | NO |

*YES represnts the defects is visible;
NO represents the defects are invisible;
Slight represents the defects are slightly visible.

Figure 13:
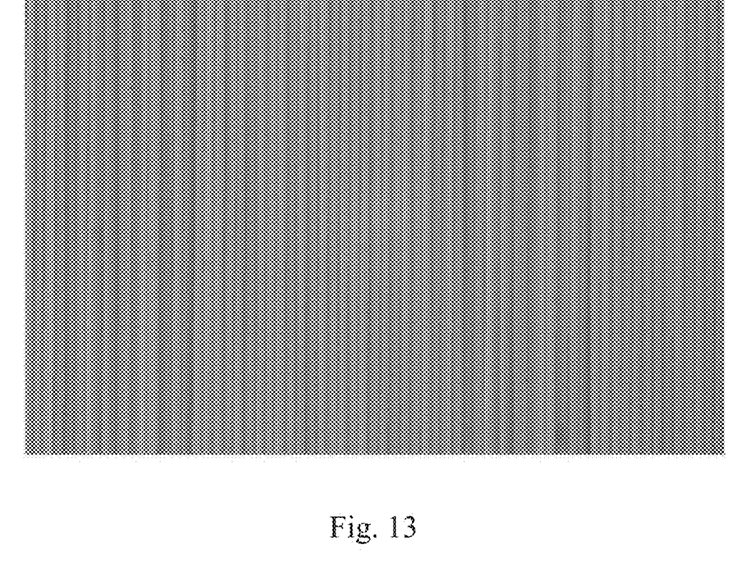
FIG. 13 shows an actual stereo diagram of the sample 11 in table 1 through a microscope.
Figure 14:
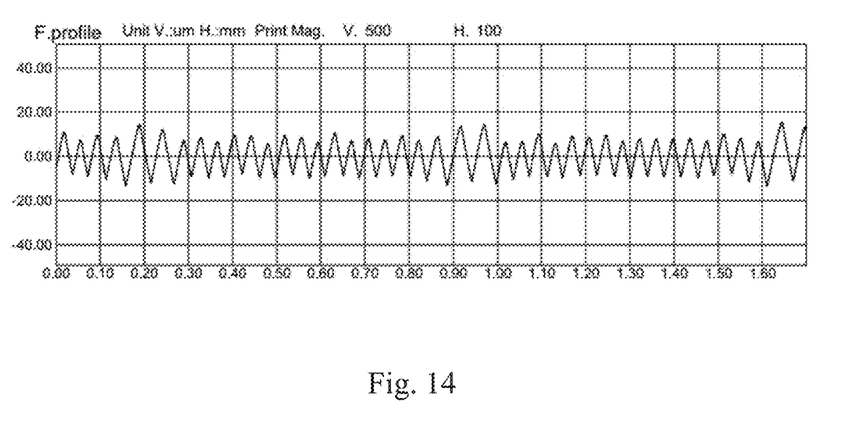
FIG. 14 shows a measured two-dimensional profile through a three-dimensional contour gauge (Kosaka ET4000a)
Figure 15:
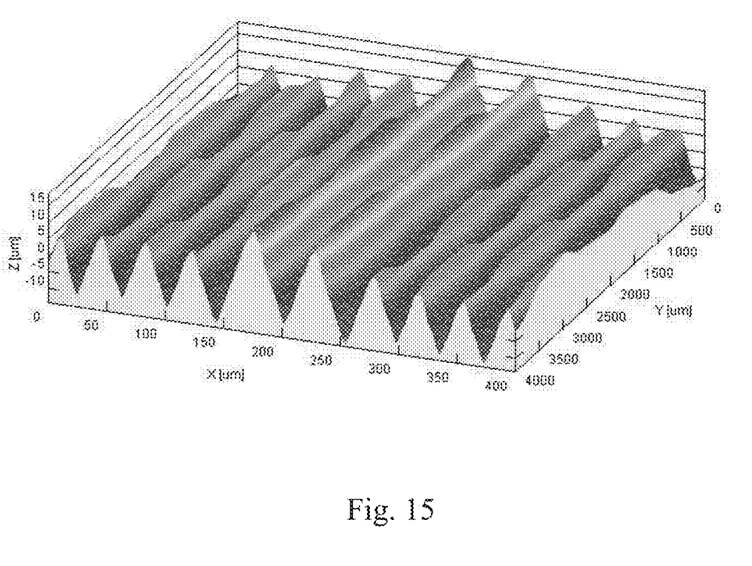
FIG. 15 shows a measured three-dimensional profile through a three-dimensional contour gauge (Kosaka ET4000a).

FIG. 13 shows an actual stereo diagram of the sample 11 in table 1 through a microscope. Through the microscope, the nominal period of the first change period can be identified as the total width of 17 prisms (nominal pitch is 38 μm), and hence, the length of the nominal period is around 676 μm. FIGS. 14 and 15 shows measured two-dimensional and three-dimensional profiles through a three-dimensional contour gauge (Kosaka ET4000a). FIG. 14 is a two-dimensional profile by scanning along the X direction. This figure shows that the height of the prim randomly varies (about 3 μm). A very high prism appears for each interval of 676 μm. The very high prism has a variation of about 3 μm in its height, and hence, the length of the first change nominal period for the sample 11 is 676 μm and its amplitude is 7.5 μm. Moreover, the length of the second change nominal period is 2,000 μm and its amplitude is 3 μm. And, the length of the first change period is 0.338 times that of the second change period. FIG. 15 shows a measured three-dimensional profile through a three-dimensional contour gauge (Kosaka ET4000a).

The foregoing embodiments of the invention have been presented for the purpose of illustration. Although the invention has been described by certain preceding examples, it is not to be construed as being limited by them. They are not intended to be exhaustive, or to limit the scope of the invention. Modifications, improvements and variations within the scope of the invention are possible in light of this disclosure.

The invention claimed is:

1. An optical film, comprising:
a substrate; and
a structuralized layer disposed on the substrate, wherein the structuralized layer comprises a plurality of prisms extending substantially in a first direction;
wherein each of the plurality of prisms comprises a plurality of elevating portions and a plurality of non-elevating portions alternating with each other along the first direction, wherein a first ridge of each of the plurality of the elevating portions swings up and down to form a plurality of peaks and a plurality of valleys, wherein the plurality of peaks and the plurality of valleys are interleaved with each other on the first ridge, wherein all of the plurality of peaks are of substantially the same height.

2. The optical film according to claim 1, wherein the first ridge of each of the plurality of the elevating portions swings up and down in a regular, half-regular, random or quasi-random manner.

3. The optical film according to claim 1, wherein the first ridge of each of the plurality of the elevating portions swings up and down in a manner of a sine wave, a square wave, a saw wave or a triangle wave.

4. The optical film according to claim 1, wherein pitches between the plurality of prisms are between 10 μm to 200 μm.

5. The optical film according to claim 1, wherein the minimum height of the elevating portions is larger than the maximum height of the non-elevating portions.

6. The optical film according to claim 1, wherein the first ridge of each of the plurality of the elevating portions swings up and down in the form of a wave, wherein the wave is substantially a square wave.

7. The optical film according to claim 1, wherein the minimum height of the elevating portions is larger than the minimum height of the non-elevating portions.

8. The optical film according to claim 1, wherein the prism further comprises a transition portion connecting the elevating portion to the non-elevating portion.

9. The optical film according to claim 1, wherein the plurality of prisms meander in a first direction.

10. The optical film according to claim 1, wherein a second ridge of each of the plurality of the non-elevating portions swings up and down.

11. The optical film according to claim 10, wherein the second ridge of each of the plurality of the non-elevating portions swings up and down in a regular, half-regular, random or quasi-random manner.

12. The optical film according to claim 10, wherein the plurality of prisms meander in a first direction.

13. The optical film according to claim 10, wherein the second ridge of each of the plurality of the non-elevating portions swings up and down in a manner of a sine wave, a square wave, a saw wave or a triangle wave.

14. An optical assembly, comprising:
a first optical sheet comprising an optical film according to claim 1; and
a second optical sheet disposed on the first optical sheet, wherein the second optical sheet is in contact with the peaks of the first ridges of the elevating portions of the plurality of prisms and not in contact with the non-elevating portions of the plurality of prisms.

15. The optical film according to claim 14, wherein the prism further comprises a transition portion connecting the elevating portion to the non-elevating portion.

16. The optical film according to claim 14, wherein the plurality of prisms meander in a first direction.

17. The optical film according to claim 14, wherein the minimum height of the elevating portions is larger than the minimum height of the non-elevating portions.

* * * * *